(No Model.)
S. SHUGERMAN.
VESSEL FOR SEPARATING LIQUIDS.
No. 539,779. Patented May 21, 1895.
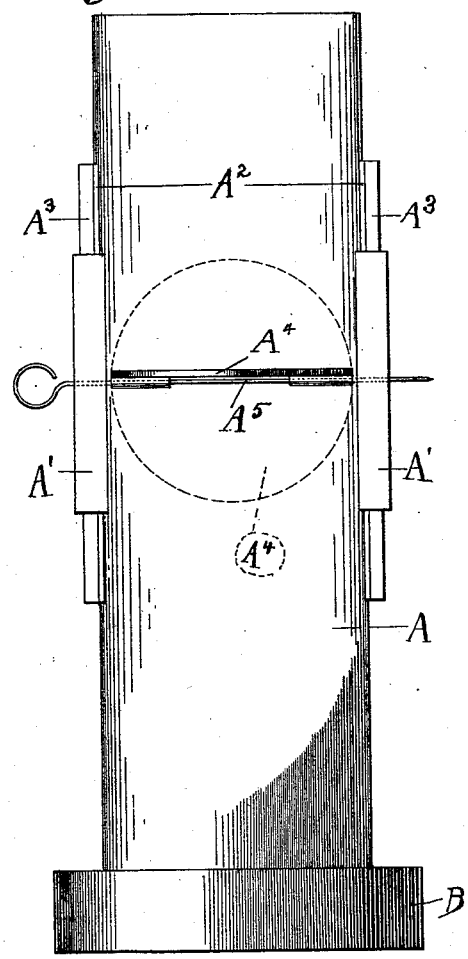
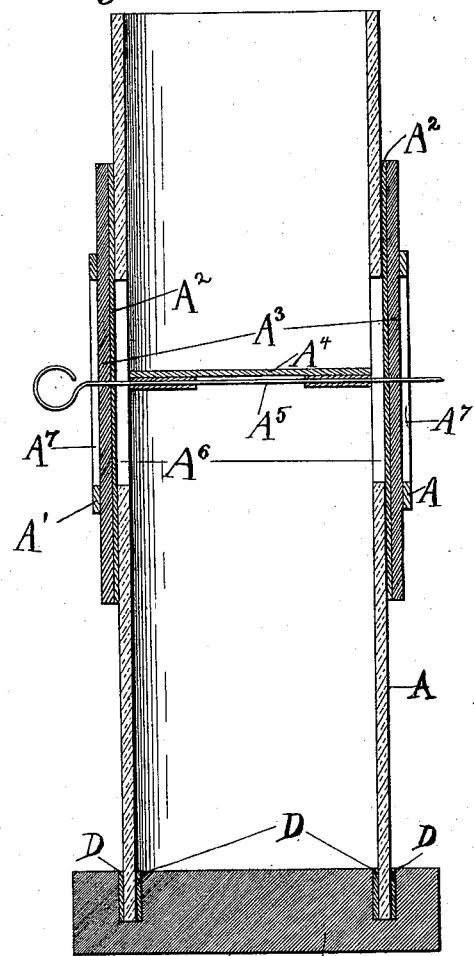
Witnesses.
Francis M. Ireland
D. M. Carter
Inventor.
Samuel Shugerman
By
Francis M. Parker,
Attorney.

UNITED STATES PATENT OFFICE.

SAMUEL SHUGERMAN, OF CHICAGO, ILLINOIS.

VESSEL FOR SEPARATING LIQUIDS.

SPECIFICATION forming part of Letters Patent No. 539,779, dated May 21, 1895.

Application filed July 23, 1894. Serial No. 518,327. (No model.)

*To all whom it may concern:*

Be it known that I, SAMUEL SHUGERMAN, a subject of the Sultan of Turkey, residing at Chicago, county of Cook, and State of Illinois, have invented certain new and useful Vessels for Separating Liquids, which are fully set forth in the following specification, reference being had to the accompanying drawings, forming a part thereof.

My invention relates to vessels for separating liquids that are together in the same vessel but are of a different specific gravity and has for its object to produce a vessel by which such separation can be easily and quickly accomplished.

The following is a description of my device, reference being had to the accompanying drawings, wherein—

Figure 1 is a view of the vessel with one end removed. Fig. 2 is a longitudinal section. Fig. 3 is a side view of one of the detached ends.

Like letters refer to like parts throughout the several figures.

The body A of the vessel preferably of glass is open at both ends and is provided with the removable end pieces B, C, preferably of gutta percha or the like. These end pieces are provided with annular grooves into which the ends of the vessel A fit, Fig. 2. Said grooves are provided with the packing D so as to make a tight joint. These end pieces B, C, are of such shape that the vessel A will stand when either is used as the base.

Between the two ends of the vessel A are the grooved strips or guides $A'$, $A'$, integral with or rigidly attached to the outer surface of the vessel and placed so as to be opposite each other. Within the grooves in said guides and free to move therein are the strips of packing $A^2$, $A^2$, and the elastic or spring pieces, $A^3$, $A^3$. A circular disk $A^4$ which just fits within the opening of the vessel A is attached to the rod or pin $A^5$ which passes through the packing $A^2$ and the spring pieces $A^3$, $A^3$. Said rod or pin is free to revolve so that the position of the disk $A^4$ may be varied.

The vessel A is provided with the slots $A^6$, $A^6$, and the guides $A'$, $A'$, with the slots $A^7$, $A^7$, so as to allow the pin or rod $A^5$ to be moved up and down so as to vary the distance between the disk $A^4$ and the ends of the vessel.

It is evident that these several parts may be changed in form and construction without departing from the spirit of my invention and I therefore do not wish to be limited to the exact construction shown.

The strips of packing $A^2$, $A^2$, are so situated as to cover the slots $A^6$, $A^6$, in the vessel A and the spring pieces $A^3$, $A^3$, press said strips of packing against the surface of the vessel so as to make a tight joint and prevent the liquid from escaping.

It is evident that I may alter the construction and mode of operation of the end pieces B, C, for example by having said ends move about a fulcrum or fulcrums attached to the vessel A similar to the lid of a sirup pitcher or the like and hence I do not wish to be limited to the exact construction shown.

The use and operation of my invention are as follows: When it is desired to separate the light and heavy liquid the vessel is placed so as to be supported on the end piece B and the end piece C is removed. The rod $A^5$ is rotated until the disk $A^4$ takes the vertical position as shown in dotted lines Fig. 1. The liquid is now poured in and the rod $A^5$ moves until the disk $A^4$ is brought to the dividing line between the two liquids. The rod is then rotated until the disk $A^4$ is brought to the position shown in Fig. 2. When in this position the opening in the vessel is closed—*i. e.*, the vessel is divided into two parts, the lighter liquid being above the disk and the heavier liquid below. The end piece D is now put in place on the top end of the vessel A and the vessel inverted so that it will be supported on said end piece. On removing the end piece B the heavier liquid can be poured out and will be entirely free from the lighter material.

It will be seen that I have here a device for quickly and easily separating liquids of a different specific gravity or for separating liquids from any dross or the like that may be floating on the surface. It will also be noticed that I have a reversible vessel in which either end may be used as the bottom.

I claim—

1. A device for separating liquids or the like comprising a vessel having two removable ends and a revoluble disk intermediate between said ends.

2. A device for separating liquids or the like comprising a vessel having removable ends, a revoluble disk intermediate between said ends and means of moving said disk so as to vary its distance from the ends.

3. A device for separating liquids or the like comprising a reversible vessel having removable ends of such shape that either may be used as a support for the vessel, a revoluble disk intermediate between said ends, and means by which said disk may be revolved and raised or lowered substantially as described.

4. The combination in a device for separating liquids or the like of a vessel open at both ends but supplied with removable end pieces, a disk intermediate between said ends, a rod connected to said disk and having its ends projecting through slots in said vessel, two grooved guides rigidly attached to said vessel so as to cover the slotted portion and provided with slots for said rod, a spring piece working in the groove of each guide and through which the said rod passes and a strip of packing between each of said spring pieces and the vessel arranged so as to cover the slot in said vessel.

SAMUEL SHUGERMAN.

Witnesses:
DONALD M. CARTER,
FRANCIS M. IRELAND.